Figure 1:
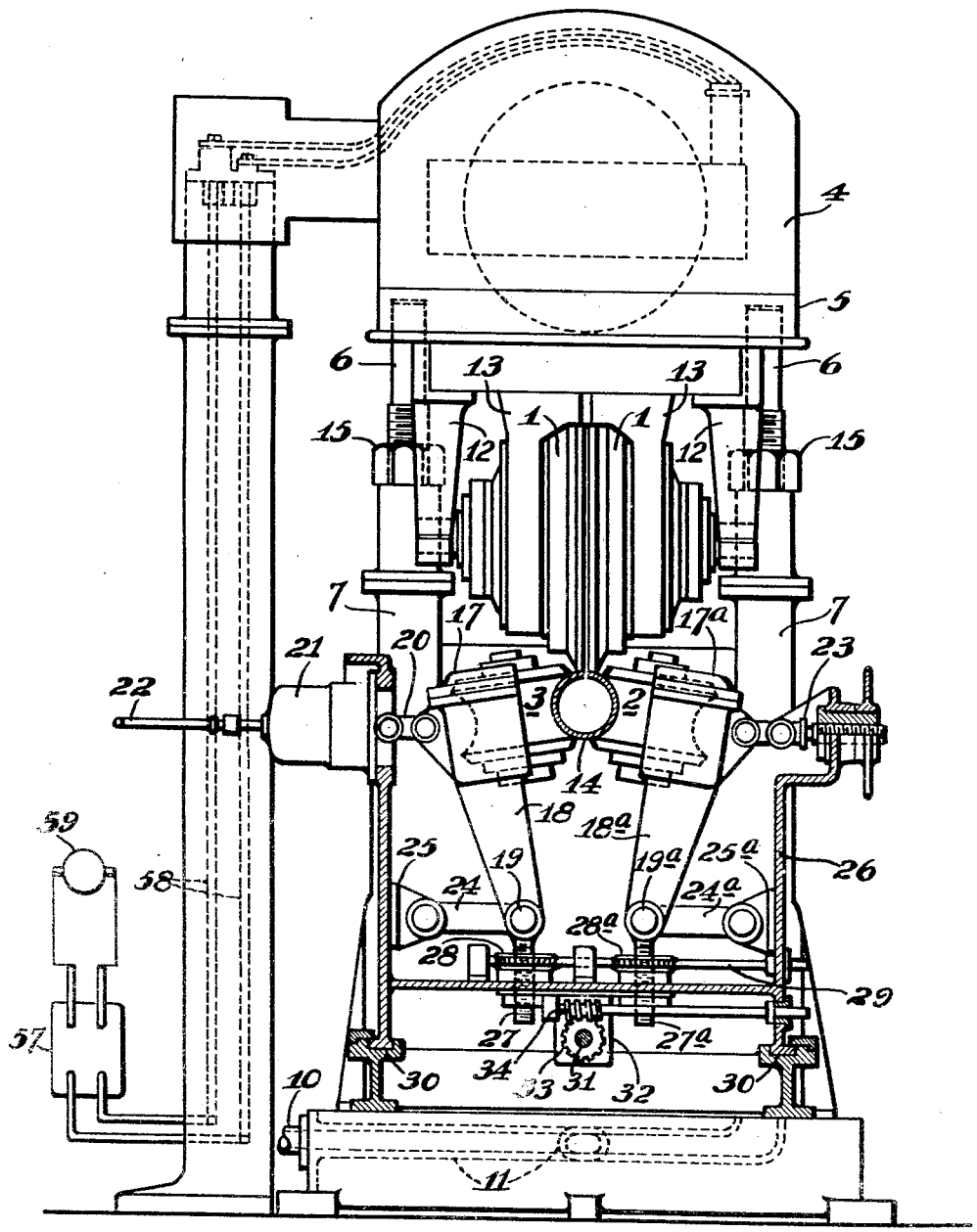

July 30, 1935.  R. C. F. KURTZE  2,009,501
ELECTRIC SEAM WELDING
Filed Oct. 28, 1932  2 Sheets-Sheet 1

WITNESSES  INVENTOR

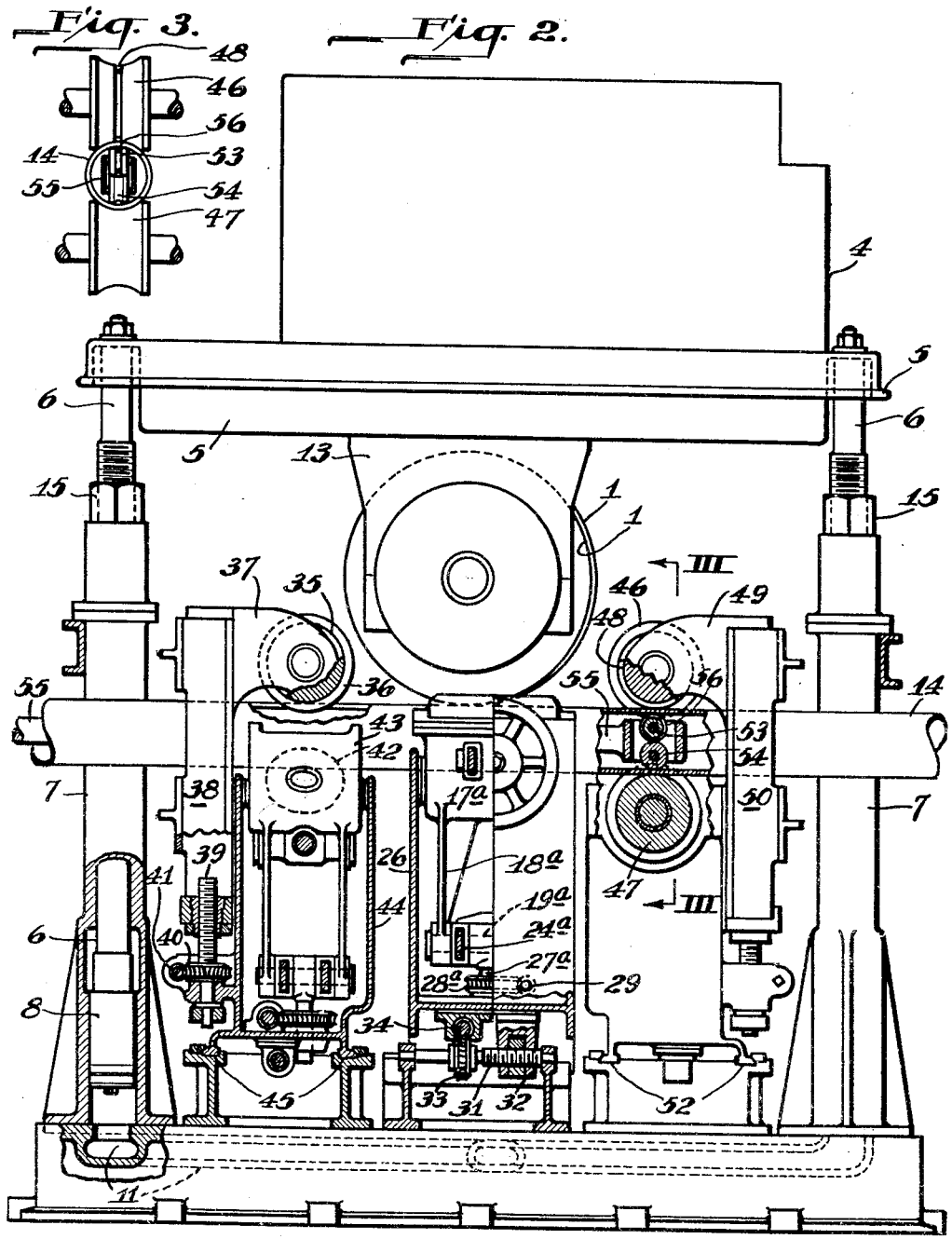

Patented July 30, 1935

2,009,501

UNITED STATES PATENT OFFICE 2,009,501

ELECTRIC SEAM WELDING

Reimar C. F. Kurtze, Youngstown, Ohio; Arthur Morgan, administrator of said Kurtze, deceased, assignor to Republic Steel Corporation, Youngstown, Ohio, a corporation of New Jersey Application October 28, 1932, Serial No. 639,992

4 Claims. (Cl. 219—6)

This invention relates to seam welding, particularly of tubing, and it is among the objects of the invention to provide an improved method of and apparatus for electric resistance seam welding, which produce uniformly welded seams, permit operation at high rates of speed, and which, among other things, minimize or overcome disadvantages heretofore present in this art.

In the commercial practice of electric resistance seam welding of tubing various difficulties are encountered because the stock from which the skelp is formed is not uniform. Hence the tubular blank presents irregularities in consequence of which there are produced variations in the welding conditions, and these may affect adversely the uniformity or quality of the welded seam. It has been proposed to overcome these disadvantages by varying the pressure of the electrodes upon the blank to vary the electrode contact area in accordance with such irregularities so as to maintain the resistance of the circuit uniform, and thereby to obtain uniform flow of welding current. Such procedures are not readily adapted to satisfactory commercial welding of tubing at high rates of speed, partly because when the movement of the "blank" is so rapid through the welding throat the irregularities pass the electrodes so quickly that the electrode contact pressure can not be varied rapidly enough to obtain the desired result. In other words, by the time the contact pressure can be adjusted to a given irregularity that portion of the blank has left the welding throat and the conditions in the welding zone have changed, therefore, before the altered pressure can accomplish its purpose. Moreover, these procedures are not satisfactory because very delicate adjustments are necessary fully to accomplish the desired result, and these are not practicable in commercial practice.

The present invention may be described in connection with the accompanying drawings, which represent its application to the welding of tubing, and in which Figure 1 is a front view of an apparatus, partly in section, showing the preferred embodiment of the invention, taken in a plane adjacent the electrodes; Figure 2 a side view, partly in section, of the apparatus shown in Fig. 1; and Fig. 3 a fragmentary view showing the weld-shaping rolls, taken on line III—III, Fig. 2.

This invention is predicated upon the maintenance of uniform unvarying electrode contact pressure irrespective of irregularities in the blank, and upon compensating for changes in resistance in the welding zone caused thereby by automatically regulating the voltage applied to the transformer primary in conformity herewith, to thereby obtain uniform flow of welding current and uniform heating.

In accordance with the invention, the electrodes and transformer are suspended to be supported by, and for vertical movement in response to irregularities in, the blank, and a portion of the weight of the electrodes and transformers is hydraulically counterbalanced under a uniform pressure, the remaining portion of the weight being carried directly by the stock to exert the desired contact pressure.

The maintenance of uniform contact pressure results in variations in the volume of welding current, because of variations in the electrode contact area arising from the irregularities referred to. In accordance with this invention such variations are compensated by automatically varying the voltage applied to the primary of the transformer, and thereby to apply constant welding current volume across the seam.

Important advantages flow from these features of the invention. Thus the electrodes rise and fall freely in accordance with irregularities in the blank, and since they are hydraulically supported the electrode contact pressure remains uniform whether such irregularities be elevations of, or depressions in, the blank. These combine to provide accurate and rapid response to the irregularities, whereby substantially constant welding conditions may be maintained. Such variations in volume of current as would be due to changes in resistance across the seam in the welding zone are also rapidly compensated for by the automatic transformer regulation. Accordingly this invention provides a more rapid and more satisfactory mode of obtaining uniformity of conditions in the welding zone than has been possible heretofore, e. g. by vertical adjustment of the electrodes to vary their pressure in such manner as to control the volume of current flowing across the seam.

Having reference now to the accompanying drawings, the apparatus there shown, by way of example, comprises a welding throat including a pair of roller electrodes 1 supported for rotation in contact with the skelp on opposite sides of the seam, and a pair of side-pressure rolls 2 and 3.

In accordance with this invention, the transformer and the electrodes are hydraulically suspended over the stock to be welded. In the embodiment shown the welding transformer 4 is mounted upon a platform 5 supported at its corners by rods 6 vertically movable in hydraulic cylinders 7. At their lower ends rods 6 rest upon pistons 8 movable within the cylinders under the influence of hydraulic pressure. A uniform, although adjustable, pressure is applied to the pistons from an accumulator of any suitable construction, not shown, through a pipe 10 and ducts 11 opening into the cylinders below pistons 8.

The electrodes 1 are carried by a shaft mounted in brackets 12 rigidly suspended from platform 5. The secondary poles of the transformer are rigidly connected to massive terminals 13, of material of good electrical conductivity, through which welding current is supplied to the electrodes according to any desired construction, for flow of current between the electrodes across the seam of a tubular blank 14.

The apparatus also includes means for limiting the downward movement of the electrodes when the end of a blank has passed through the welding throat. Various means may be employed for this purpose, that shown comprising nuts 15 threadably mounted upon rods 6. The nuts are adjusted longitudinally of the rods in accordance with the diameter of the blank so as to permit rise and fall of the rods in response to any irregularities which may be encountered in the blank. When the end of a blank has left the electrodes the nuts contact with the upper ends of cylinders 7 and prevent further dropping of the electrode-platform-transformer assembly, this distance being regulated to permit ready insertion of the next blank.

The construction of suitable electrodes is well known in the art and forms no part of this invention. The electrodes are preferably mounted for adjustment toward and from each other, and longitudinally of the apparatus, in the manner and for the purposes known in the art. Most suitably the electrodes are not exactly opposed, but are mounted to be offset with respect to each other, as shown in Fig. 2. With such offsetting of the electrodes longitudinally of the seam, the welding current does not flow directly across the seam, but instead is caused to travel longitudinally of it and to flow in diffused paths in so doing. Accordingly each incremental length of the seam is traversed by a plurality of current impulses flowing in a variety of paths. This produces uniformity of heating and assists in the production of uniform homogeneous welds. No claim is made herein to such offsetting of the electrodes, or to the method of welding therewith, these being described and claimed in a copending application, Serial No. 582,711, filed by me on December 23, 1931.

In accordance with the customary practice side pressure rolls 2 and 3 are mounted for adjustment. In the embodiment shown these rolls are individually laterally adjustable, one of them, for example 3, being hydraulically backed so as to yieldingly maintain uniform pressure in the welding throat. As shown in Fig. 1 roller 3 is mounted in a bearing bracket 17 having downwardly extending legs 18 pivotally mounted on a shaft 19 for rocking of the roller toward and from blank 14. The body of bracket 17 is also pivotally connected by a link 20 to a hydraulic piston mounted within a cylinder 21. An accumulator, not shown, separate from that used for counterbalancing the weight of the electrodes and transformer, and connected to cylinder 21 through a duct 22 maintains a uniform pressure on the piston and hence on roll 3.

Roller 2 is likewise journalled in a bearing bracket 17a carried by legs 18a pivotally mounted on a shaft 19a. This roller is adjusted laterally by a screw 23, Fig. 1, and is held in fixed position at any given adjustment. In order to prevent lateral play of these rollers, bracket legs 18 and 18a are connected by pivot links 24 and 24a to studs 25 and 25a, respectively, on frame 26.

Means are provided also for adjusting rollers 2 and 3 vertically, and for shifting them longitudinally of the apparatus. Shafts 19 and 19a are supported respectively by screws 27 and 27a, respectively, which are keyed in worm gears 28 and 28a. These gears are rotated by worms on a rod 29, whereby rollers 2 and 3 may be raised or lowered simultaneously. As shown in Fig. 1, frame 26 is mounted in longitudinal ways 30, in which it may move to shift the rollers as a unit longitudinally of the apparatus. This is effected by a screw 31 moving in threads in a stud 32 connected to the frame. Screw 31 is keyed in a worm gear 33 actuated by a worm 34.

The apparatus also includes a group of seam-guiding rolls located ahead of the electrodes, in accordance with conventional practice in the art. This group includes an upper roll 35 having a seam-guiding fin 36. This roll is journalled in a bracket 37 carried by a vertical post 38 the lower end of which is threaded to receive a screw 39 keyed to a worm wheel 40 actuated by a worm 41. Rotation of the worm causes the screw to act in the base of the rod as a nut, raising or lowering roll 36 according to need. The other rolls 42 of this unit are mounted in bracket members 43 carried by a frame 44, which also carries roll 36 and its adjusting mechanism. Brackets 43 are constructed and provided with adjusting means similar to those shown and described for roll 2, including similar means for shifting this group of rolls transversely of the apparatus in ways 45.

Located beyond the welding throat is a group of finishing or discharge rolls. The embodiment shown comprises upper and lower arcuate rolls 46 and 47 acting upon the exterior of the welded tube. Upper roll 46 is provided with a centrally disposed groove 48 adapted to straddle the completed seam. This roll is mounted with its axis horizontal in a bearing bracket 49 supported by a post 50 which is adjustable vertically in the manner explained for finned roll 35. Lower roll 47 is also journalled horizontally in a frame 51, and is provided with suitable means for adjusting the roll vertically. Frame 51 also carries post 50, and it is movable in ways 52 transversely of the longitudinal axis of the stock, as explained in connection with frame 44. These rolls are backed by interior rolls 53 and 54, of the form shown in Fig. 3, mounted loosely in a cage carried by a mandrel 55 supported in the tube. Upper roll 53 is provided centrally with a seam-straddling groove 56. This group of rolls acts to overcome the tendency of the electrode pressure to flatten the blank in the region of the seam. The grooves in rolls 53 and 46 permit the hot metal in the freshly formed weld to spread out under the action of the rolls in restoring the cylindrical contour of the blank, instead of acting to flatten the burr and press oxide and the like into the seam. Any burr may be removed later by means known and used in the art.

In the practice of the invention the rolls are adjusted by the means described to properly accommodate the blanks to be welded, and the accumulator acting upon pistons 8 is adjusted to counterbalance the desired proportion of the height of the transformer, electrodes and associated parts to give the desired electrode pressure on the blanks. The welding then proceeds in the conventional manner. As the blanks pass through the welding throat irregularities in contour, or size, result in vertical rise and fall of the electrodes against or under the influence of the hydraulic pressure in cylinders 7. This maintains a substantially uniform and unvarying electrode pressure on the blanks at all times. This action is assisted by the hydraulic backing of side pressure roll 3, in like manner.

Since the electrode pressure is constant in value the movements of the electrodes in response to irregularities in the stock induce variations in the electrode contact area, and consequently in the current volume. For instance, when the electrodes are on the crest of a wave-like longitudinal irregularity the contact area will decrease, for which reason the resistance will be greater and the volume of current less than when the electrodes bear upon a depression in the stock.

In order to compensate for such variations in the current volume induced by changes in the contact area arising from such irregularities, the voltage applied to the primary of the transformer is maintained constant by means of an automatic voltage regulator 57, indicated schematically in Fig. 1, which regulates the voltage supplied to primary buses 58 from the generator 59. Various types of such regulators are known and may be used in the practice of the invention. Thereby the current volume passed across the seam between the electrodes is maintained uniform.

This differs radically from prior proposals in this art, according to which the contact pressure is varied in an attempt to maintain uniform contact area, and thereby to control the current volume. As compared therewith the present invention overcomes the adverse effects of irregularities in the blank in a more positive, simple and satisfactory manner. Thus the electrodes react automatically and instantaneously to such irregularities, and automatic electric transformer regulation insures rapid compensation for the variations in contact area which result from electrode movement. Accordingly there is uniformly maintained substantial uniformity of welding conditions, with fully automatic operation. Other advantages will appear to those skilled in the art.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. In an electric seam welding apparatus, the combination of an hydraulic cylinder having a piston movable therein, a platform carried by said piston for vertical movement over the blank being welded, a transformer mounted on said platform, a pair of electrodes suspended from said platform and connected to the secondary terminals of said transformer for contact with opposite sides of the seam, and hydraulic pressure means associated with said cylinder uniformly counterbalancing an adjustably predetermined portion of the weight of said transformer and electrodes, whereby the electrodes move vertically in response to irregularities in the blank and continuously apply a uniform unvarying contact pressure thereto.

2. In an electric seam welding apparatus, the combination of a platform mounted for vertical movement over the blank being welded, an hydraulic piston supporting each corner of the platform, a transformer mounted on said platform, a pair of electrodes suspended from the platform and connected to the secondary terminals of said transformer for contact with opposite sides of the seam, and an accumulator acting upon the platform-supporting pistons to uniformly counterbalance an adjustably predetermined portion of the weight of said transformer and electrodes, whereby the electrodes move vertically in response to irregularities in the blank and continuously apply a uniform unvarying contact pressure thereto.

3. In an electric seam welding apparatus, the combination of an hydraulic cylinder having a piston movable therein, a platform supported by said piston for movement vertically of the blank being welded, a transformer mounted on said platform, a pair of electrodes suspended from the platform and connected to the secondary terminals of said transformer for contact with opposite sides of the seam, hydraulic pressure means associated with said cylinder uniformly counterbalancing an adjustably predetermined portion of the weight of said transformer and electrodes, the electrodes moving vertically in response to irregularities in the stock and continuously applying a uniform unvarying contact pressure thereto, and means automatically regulating the primary voltage of the transformer to compensate for changes in contact area induced by said irregularities and to maintain constant current volume across the seam.

4. An apparatus according to claim 3, and means for limiting downward movement of the platform when the blank leaves the electrodes.

REIMAR C. F. KURTZE.